(12) United States Patent
Shehata et al.

(10) Patent No.: US 9,075,879 B2
(45) Date of Patent: Jul. 7, 2015

(54) SYSTEM, METHOD AND COMPUTER PROGRAM FOR SEARCHING WITHIN A SUB-DOMAIN BY LINKING TO OTHER SUB-DOMAINS

(76) Inventors: Shady Shehata, Waterloo (CA); Fakhri Karray, Waterloo (CA); Mohammed Salem Kamel, Waterloo (CA)

( * ) Notice: Subject to any disclaimer, the term of this patent is extended or adjusted under 35 U.S.C. 154(b) by 0 days.

(21) Appl. No.: 13/497,564

(22) PCT Filed: Sep. 24, 2010

(86) PCT No.: PCT/CA2010/001496
§ 371 (c)(1),
(2), (4) Date: May 29, 2012

(87) PCT Pub. No.: WO2011/035426
PCT Pub. Date: Mar. 31, 2011

(65) Prior Publication Data
US 2012/0233181 A1    Sep. 13, 2012

Related U.S. Application Data

(60) Provisional application No. 61/245,847, filed on Sep. 25, 2009.

(51) Int. Cl.
G06F 17/30    (2006.01)
(52) U.S. Cl.
CPC .................. *G06F 17/30864* (2013.01)
(58) Field of Classification Search
None
See application file for complete search history.

(56) References Cited

U.S. PATENT DOCUMENTS

| | | | |
|---|---|---|---|
| 6,311,194 B1 | 10/2001 | Sheth et al. | |
| 2005/0192946 A1* | 9/2005 | Lu et al. | 707/3 |
| 2006/0015498 A1 | 1/2006 | Sarmiento et al. | |
| 2006/0095430 A1* | 5/2006 | Zeng et al. | 707/7 |
| 2006/0173830 A1 | 8/2006 | Smyth et al. | |
| 2007/0156677 A1 | 7/2007 | Szabo | |
| 2008/0140647 A1* | 6/2008 | Bailey et al. | 707/5 |
| 2008/0147644 A1* | 6/2008 | Aridor et al. | 707/5 |
| 2008/0235187 A1* | 9/2008 | Gade et al. | 707/3 |
| 2009/0006372 A1 | 1/2009 | Rosario et al. | |
| 2010/0125573 A1* | 5/2010 | Venolia | 707/722 |

FOREIGN PATENT DOCUMENTS

| | | |
|---|---|---|
| EP | 1843257 A1 | 10/2001 |
| WO | WO9812881 A2 | 3/1998 |

OTHER PUBLICATIONS

Set and Subset, http://www.philosophy-index.com/logic/terms/sub-set.php.*

* cited by examiner

*Primary Examiner* — Robert Beausoliel, Jr.
*Assistant Examiner* — Hau H Hoang
(74) *Attorney, Agent, or Firm* — Norton Rose Fulbright Canada LLP

(57) ABSTRACT

The present invention may provide a system, method and computer program for searching a sub-domain that involves linking to other sub-domains. In particular, the present invention may provide a sub-domain search that ranks and/or weighs search results based on relevance, such relevance being determined by a calculation operating on a broader range of domain and/or sub-domains than a single sub-domain. The present invention may weight and score a search of web pages in a sub-domain based on the content of web pages in other sub-domains.

21 Claims, 7 Drawing Sheets

PRIOR ART

PRIOR ART

FIG. 4

Semanteks Intranet Search

Intelligent search builds semantic intranet - Semanteks your intranet

| pattern analysis and machine intelligence | *Search Criteria* |

100 Results Per Page [Search]

Semanteks©2008

FIG. 5

Semanteks Intranet Search

| Document | Summary |
|---|---|
| Michel Van Aerde Memorial Scholarship | Graduate Studies | Electrical and Computer Engineering | University of Waterloo | [University of Waterloo] Search in ECE all of UW Skip to the content of the web site. ECE Home About ECE Undergraduat Studies Graduate Studies Prospective Students Current Student Information P |
| LORNET e-Learning Scientific Conference Awards | Graduate Studies | Electrical and Computer Engineering | University of Waterloo | [University of Waterloo] Search in ECE all of UW Skip to the content of the web site. ECE Home About ECE Undergraduat Studies Graduate Studies Prospective Students Current Student Information P |
| Research Groups | Electrical and Computer Engineering | University of Waterloo | [University of Waterloo] Search in ECE all of UW Skip to the content of the web site. ECE Home About ECE Undergraduat Studies Graduate Studies Research Research Chairs Facilities Areas Groups I |
| Open House | Graduate Studies | Electrical and Computer Engineering | University of Waterloo | [University of Waterloo] Search in ECE all of UW Skip to the content of the web site. ECE Home About ECE Undergraduat Studies Graduate Studies Prospective Students Current Student Information P |
| Technical Electives | Undergraduate Studies | Electrical and Computer Engineering | University of Waterloo | [University of Waterloo] Search Undergraduate Studies, ECE, or all UW Skip to the content of the web site. ECE Home Undergraduate Home About Us Prospective Students Computer Engineering Electrical |
| Research Areas | Electrical and Computer Engineering | University of Waterloo | [University of Waterloo] Search in ECE all of UW Skip to the content of the web site. ECE Home About ECE Undergraduat Studies Graduate Studies Research Research Chairs Facilities Areas Groups I |
| Zhou Wang | Electrical and Computer Engineering | University of Waterloo | [University of Waterloo] Search in ECE all of UW Skip to the content of the web site. ECE Home About ECE Undergraduat Studies Graduate Studies Research People Faculty Administrative Staff Techn |

Waterloo
UNIVERSITY OF

Search ⊙ in ECE ○ all of UW [        ] [Search]

The Department of Electrical and Computer Engineering

Research

ECE Home
About ECE
Undergraduate Studies
Graduate Studies
Research
  Research Chairs
  Facilities
  Areas
  Groups
  Industry
People
Partnership
Computing Resources
Seminars
Site Map

Research Groups

Groups in Electrical and Computer Engineering

- Communications and Information Systems
  - Broadband Communications (BBCR)Research Group
  - Centre for Wireless Communications Research Group
  - Leitch - University of Waterloo Multimedia Communications Laboratory
  - Coding and Signal Transmission (CST) Laboratory

- CMOS Design and Reliability Group

- Control Systems Group

- Generative Software Development Lab

- Giga-to-Nano Electronics Group

- Integrated Quantum Optoelectronics Laboratory

- Intelligent Integrated Radio and Photonics Group (IIRPG)

- Nanotechnology Group

- Pattern Analysis and Machine Intelligence Group

- Power and Energy Systems Group

- Radio Frequency Silicon Device and Integrated Circuit Group

- Silicon Thin-Film Applied Research (STAR) Group

- Software Technologies Applied Research (STAR) Group

- VLSI Research Group

Affiliated Groups

- Advanced Micro- / Nano- Devices Lab

Department of Electrical and Computer Engineering campaign waterloo

FIG. 7

SYSTEM, METHOD AND COMPUTER PROGRAM FOR SEARCHING WITHIN A SUB-DOMAIN BY LINKING TO OTHER SUB-DOMAINS

PRIORITY CLAIM

This application claims the benefit of U.S. Patent Application No. 61/245,847, filed on Sep. 25, 2009, and which is incorporated herein by reference.

FIELD OF THE INVENTION

The present invention relates generally to a web-based search and more specifically to providing search results based upon weighing and scoring a search of web pages in a sub-domain that takes into account the content of web pages in other sub-domains.

BACKGROUND OF THE INVENTION

Many search providers, such as GOOGLE™ and YAHOO™, provide functionality for targeting a web search. For example, a user can search one or more particular domains or even sub-domains for a particular search string or other search parameters. This approach to searching, including sub-domain searches, has proven to have certain merits as many domain administrators provide search fields on their own web pages that are actually just implementations of targeted searches provided by the search provider.

However, a problem that arises with this type of targeted search is that the way in which Intranet or Internet websites are structured can pose difficulties that affect the ability of a system to provide accurate search results. In particular, the organization of websites into Internet or Intranet sub-domains can result in weighing or ranking steps that either exaggerate or underestimate the relevance of particular search results. This type of a sub-domain search will only weight a webpage based on references to that webpage existing within the specific sub-domain that includes the webpage. Thus, the search input is limited and this can effect the search results.

The following example illustrates this point. Two sub-domains may exist within a webpage, the first comprising general purpose information on a field of information, for example "Pattern Analysis and Machine Intelligence" and the second being dedicated to an exhaustive analysis of the field. The first sub-domain may comprise hundreds of web pages that mention "Pattern Analysis and Machine Intelligence" but just one webpage that has a single link to the second sub-domain. If a user is unaware of the second sub-domain and searches within the first sub-domain, there is only a small likelihood that the webpage containing the link to the second sub-domain will be provided to the user as a highly ranked search result.

A variety of search result collection and presentation inventions are provided in the prior art. U.S. Pat. No. 6,311,194 discloses a system and method for examining webpage content and specifically the metadata, to assign a set of attributes to the metadata to determine categories of information represented by the metadata, by way of a WordModel. The WordModel is operable to recognize metadata as representing a hierarchy of domains and is a comprehensive infrastructure for creating the Semantic Web from the existing Web including and for realizing the applications of Semantic Web including Semantic Search. WordModel can manifest itself in the form of a collection of XML documents, or as tables in a relational database.

U.S. Patent Application No. 2006/0015498 discloses another form of search engine invention. This invention is a system and method that undertakes a characterization of a user comprising obtaining a user's personal information, making inferences about personal characteristics. The personal characteristics are utilized to calculate a fitness value for websites for the user and ranking search results based on the fitness value. This fitness value is utilized to control the presentation of search results to a user.

U.S. Patent Application No. 2009/0006372 discloses yet another invention directed to providing search results to a user. In particular, this invention is a system, method and software to automatically reorder search results presented to users based on information specific to the user or the computing environment of the user.

SUMMARY OF THE INVENTION

This invention relates to a computer-implemented system for generating sub-domain ranked or weighed search results comprising: a web server connected to an electronic information environment; at least one computing device operable by one or more computer processors to provide one or more search commands to the electronic information environment to be used to provide search information; and a sub-domain application connected to the at least one computing device and the electronic information environment, said sub-domain application being operable to receive search information from the electronic information environment and to identify one or more sub-domains of interest from the received search information, said sub-domain application further being operable to identify one or more related sub-domains and to generate search results that reflect a ranking or weighing of the sub-domain of interest in relation to the one or more related sub-domains.

In another aspect of the invention, the one or more processing elements of the sub-domain application include at least the following: a sub-domains finder operable to find the one or more sub-domains of interest in the search information; a webpage link analyzer operable to analyze the search information to identify the one or more related sub-domains; a sub-domain scorer operable to calculate one or more sub-domain of interest scores based on the analysis of the one or more sub-domains of interest in the search information, and one or more related sub-domain scores based on the analysis of the one or more related sub-domains in the search information; and a content-ranking operable to weigh and rank one or more search results that include the one or more sub-domains of interest utilizing the one or more sub-domain of interest scores and the one or more related sub-domain scores.

In yet another aspect of the invention, a computer-implemented method for generating sub-domain ranked or weighed search results is provided, the method comprising the steps of: (a) providing one or more search commands applicable to at least one sub-domain of interest within a domain to a computing device, said computing device being connected to a electronic information environment; (b) transferring the one or more search commands to the electronic information environment, said electronic information environment being operable to identify a domain of information, and to identify one or more related sub-domains from a domain that are relevant to the at least one sub-domain of interest; (c) applying a sub-domain application operable to analyze the domain and to rank and weigh the at least one sub-domain of interest in relation to the one or more related sub-domains; and (d) generating search results based upon the sub-domain application analysis.

In a still further aspect of the invention the method comprises the further steps of weighing and ranking the at least one sub-domain in accordance with one or more sub-domain of interest scores and one or more related sub-domain scores.

In yet another aspect of the invention, the method comprises the further steps of applying a sub-domain application to calculate the one or more sub-domain of interest scores and the one or more related sub-domain scores, said sub-domain application undertaking the following steps: (a) finding the at least one sub-domain of interest in domain of interest by utilizing a sub-domains finder; (b) analyzing the search information to identify the one or more related sub-domains utilizing a webpage link analyzer; (c) calculating the one or more sub-domain of interest scores based on the analysis of the at least one sub-domain of interest in the domain information, and calculating the one or more related sub-domain scores based on the analysis of the one or more related sub-domains in the domain information utilizing a sub-domain scorer; and (d) weighing and ranking the at least one sub-domain of interest in accordance with the one or more sub-domain of interest scores and the one or more related sub-domain scores utilizing a content-ranking element.

In another aspect of the invention, a computer-implemented web-based method for generating sub-domain ranked or weighed search results is provided, the method comprising the steps of: (a) obtaining a search command from a computer device utilizing the search command to define a domain and at least one sub-domain of interest within an Internet environment, said domain and at least one sub-domain of interest including one or more web pages; (b) analyzing the domain and at least one sub-domain of interest to identify one or more related sub-domains that are accessible by links from web pages in the sub-domain of interest; (c) searching within each of the one or more related sub-domains to define a related sub-domain content score for each of the one or more related sub-domains; (d) searching within the domain to define a sub-domain of interest content score for the at least one sub-domain of interest; (e) calculating a webpage content score for each of the web pages in the at least one sub-domain of interest based on the related sub-domains content score and the sub-domain of interest content score; and (f) generating search results reflecting weighing and ranking of the at least one sub-domain of interest in accordance with the webpage content score for each of the at least one sub-domain of interest.

In a still other aspect of the invention, a sub-domain computer application is provided for generating ranked or weighed search results, characterized in that the application is operable to provide instructions to a computer processor for: receiving one or more web pages representing a domain based upon one or more search parameters; searching the domain and identifying at least one sub-domain of interest in the domain; analyzing links in the one or more web pages that correspond to the at least one sub-domain of interest and that link to web pages of one or more related sub-domains; calculating the score of each of the one or more related sub-domains as one or more related sub-domain scores, and of the at least one sub-domain of interest as a sub-domain of interest score; weighing and ranking the at least one sub-domain of interest in accordance with the one or more related sub-domain scores and the sub-domain of interest score; and generating search results reflecting the weighing and ranking of the at least one sub-domain of interest.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein:

FIG. 4 illustrates an example of a search result from the prior art search previously illustrated in FIG. 3.

FIG. 5 illustrates an example of a search undertaken in accordance with the present invention.

FIG. 6 illustrates an example of search results from the search previously illustrated in FIG. 5.

FIG. 7 illustrates a webpage that is accessible from the search result previously illustrated in FIG. 6.

Figure 1:
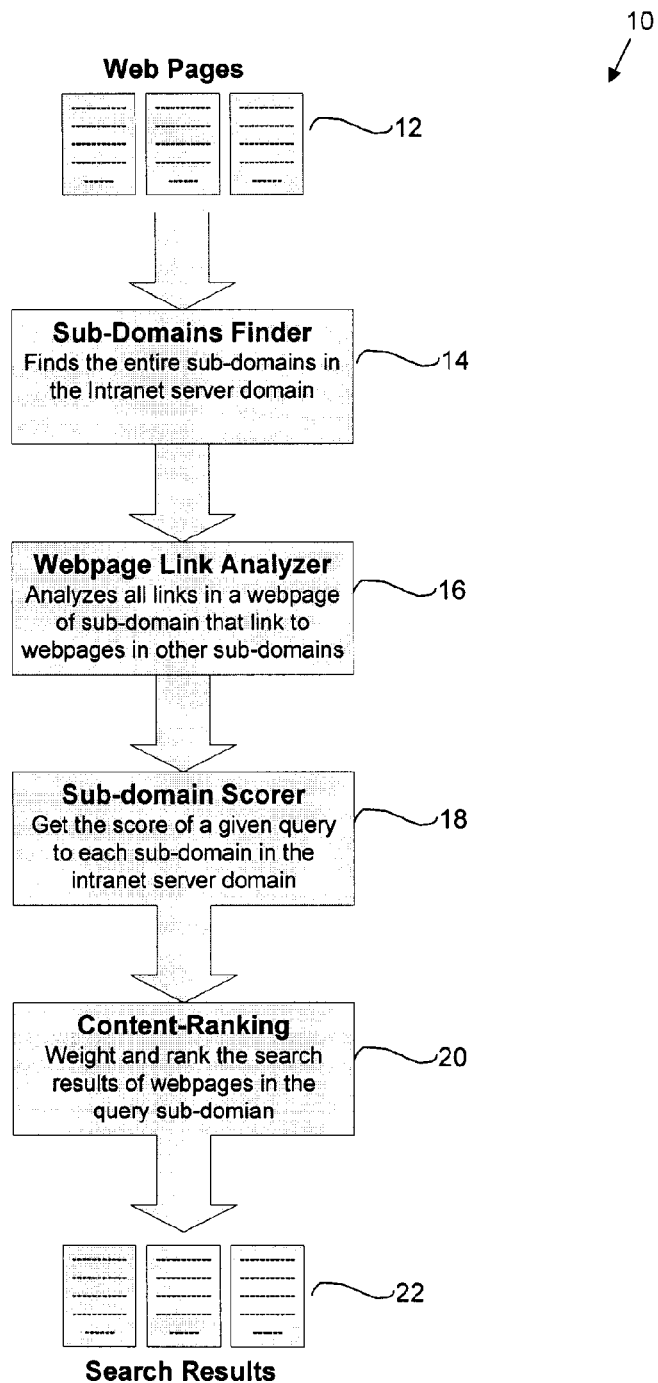
FIG. 1 illustrates a flow of system elements in accordance with an embodiment of the present invention

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention may provide a system, method and computer program for searching a sub-domain that involves linking to other sub-domains. In particular, the present invention may provide a sub-domain search that ranks search results based on relevance, such relevance being determined by a calculation operating on a broader range of relevant domains and/or sub-domains than one or more sub-domains of interest. The present invention may weigh and score a search of web pages in a sub-domain based on the content of web pages in other sub-domains.

For the purpose of clarity, this specification hereinafter refers to the searched sub-domain, being the sub-domain directly related to a user's search, as the "sub-domain of interest". All other sub-domains discussed in this specification, which may include one or more sub-domains, are referred to as "related sub-domains". Notably, the sub-domains termed related sub-domains are not required to be related to one another in any obvious manner to fit within this term, or to implement the present invention.

Additionally for the purpose of clarity, the web pages, links or other types of web content as well, whether media (for example audio, image, video, animation), documents (for example pdf, doc, odf, xml) or other web content, identified by the system of the present invention in the sub-domain of interest and related sub-domains as being related to a search term may be referenced as "identified sub-domain content". It should also be understood that the use of the term "domain" in this specification is not meant to be limiting. The present invention can be implemented to consider content that is a subset of the domain or in a domain unrelated to the sub-domain of interest. For example, one may consider any or all websites to be "sub-domains" of the "domain" that is the World Wide Web. In another example the "domain" may be .com.

The term identified sub-domain content will be utilized to reference the content of any of these environments that is related to the search term.

Searching of the Internet and/or an Intranet is frequently required for a variety of purposes relating to the function of the Internet/Intranet, as well as for other purposes to meet requirements of users of the Internet/Intranet. On many occasions searching of the Internet and/or an Intranet is conducted based upon a search term. The search term may be provided by a user or otherwise provided to a search processor of the present invention. This search term may be recognized to pertain to, and exist within, a sub-domain of interest. The system of the present invention may undertake a ranking and weighing of the identified sub-domain content that is related to the search term within the sub-domain of interest. This ranking and weighing may also include identified sub-domain content that is related to related sub-domains.

In this manner the present invention may provide a more accurate ranking or weighing of identified sub-domain content related to the search term. In particular, the system of the present invention may be operable to identify related sub-domains and to utilize these related sub-domains to provide more accurate ranking or weighing of identified sub-domain content related to the search term. The search of the system may thereby be expanded beyond a particular domain and sub-domain and may be reflective of a broader domain and/or sub-domain. The search may target the search results presented to a user to reflect solely identified sub-domain content existing within the sub-domain of interest. However, the weighing or ranking granted to the identified sub-domain content of the sub-domain of interest will reflect the weighing or ranking that is granted to that identified sub-domain content in light of the sub-domain of interest and the related sub-domains. The result of incorporating related sub-domains into the search process, and in particular of incorporating these related sub-domains into the ranking or weighing of identified sub-domain content related to the search term in the sub-domain of interest, may be that more accurate search results are provided to the user than are provided by prior art search systems.

To exemplify the advantage of the present invention over the prior art it may be helpful to compare the prior art search process to the search process of the present invention. The prior art search process may function to target a web search to involve a specific domain and/or sub-domain. Upon a search term being provided to a prior art system, the system may limit its search to incorporate one or more specific domains or sub-domains. Within the specific domains or sub-domains content related to a particular search string, or other search parameters, will be identified by the system.

This prior art search system can be affected by problems caused by the structure of Intranet or Internet websites. For example, two sub-domains may exist within a webpage. The first sub-domain may comprise general purpose information on a field of information, for example "Pattern Analysis and Machine Intelligence" may comprise content related to the search term that includes hundreds of web pages that mention "Pattern Analysis and Machine Intelligence". The second sub-domain may be dedicated to an exhaustive analysis of the field of information and the content related to the search term may comprise a single webpage that has a single link to the second sub-domain. Any ranking or weighing of content related to the search term, including the content related to the search term of the first and second sub-domains, will be unlikely to rank the second sub-domain content related to the search term highly, because there is only singular content (e.g., the webpage) representing the second sub-domain.

Notably, the prior art system generally involves a sub-domain search that solely allots weight to content related to a search term, such as a webpage, based on references to that content existing within the specific sub-domain that includes the content. Therefore, when the prior art system provides search results to a user the search results may include content from within the first sub-domain as the highest ranking results. There is a very small likelihood that the content relating to the second sub-domain will be provided to the user as a highly ranked search result in the search results. Thus, if the user is unaware of the second sub-domain the user will have to review a significant number of the total number of search results before arriving at the search result relevant to the second sub-domain.

The general outcome of the prior art search system may be that the search results do not accurately reflect rank or weigh content of the second sub-domain generally, but merely the rank or weight of content of the second sub-domain in relation to the first sub-domain. This occurs because the search is targeted and therefore includes only select domains or sub-domains. Consequently, the organization of websites into Internet or Intranet sub-domains can result in search results that reflect weighing or ranking of content that either exaggerate or underestimate the relevance of particular search results.

As a contrast, the present invention is not limited to utilizing targeted domains and/or sub-domains in the ranking and/or weighing of identified sub-domain content. To initiate a search the present invention may be provided with a search term. This search term may be provided to the system by a user, or by some other means. The search system may identify a sub-domain of interest related to the search term. The system may review the sub-domain of interest to find identified sub-domain content related to the search term. This identified sub-domain content from the sub-domain of interest will be weighed and ranked to produce search results. However, the identified sub-domain content of the sub-domain of interest may not be weighed and ranked in isolation. Related sub-domains may also be identified by the present invention and within these related sub-domains identified sub-domain content related to the search term may be found. The identified sub-domain content from these related sub-domains may also be incorporated in the weighing and ranking of the search results of the sub-domain of interest.

Thus, the overall search results of the system of the present invention may reflect not only the weight and rank of identified sub-domain content existing in the sub-domain of interest, but how that identified sub-domain content of the sub-domain of interests fits in with identified sub-domain content from all the relevant sub-domains. This outcome may be achieved by combining the identified sub-domain content from the sub-domain of interest with the identified sub-domain content of the related sub-domains, and undertaking weighing and ranking for these combined identified sub-domain content. Therefore, the final search results provided to a user may reflect weighing and ranking of identified sub-domain content for a sub-domain generally. This ranking and weighing may be more accurate than that achieved by merely weighing and ranking the identified sub-domain content of the sub-domain of interest as is undertaken by the prior art.

The present invention may offer several benefits and advantages over the prior art. One advantage of the invention is that it may provide more relevant search results. As described above, the prior art may solely reflect the rank and weight of the content of a sub-domain in isolation, or against the content of other sub-domains targeted by the search. The present invention provides a broader base of sub-domain content to be incorporated in the weighing and ranking of identified sub-domain content of the sub-domain of interest. The search results of the present invention may therefore reflect identified sub-domain content existing within a sub-domain of interest in an order that is relevant to the search term and to identify sub-domain content of relevant sub-domains.

Examples of elements of possible embodiments of the present invention are shown in the FIGS. 1-2 and 5-7. As discussed above these examples do not represent all of the possible embodiments of the present invention and therefore should not be considered to limit the scope of the invention. The description of the FIGs below should also be read as merely representing some examples of possible embodiments of the present invention and should not be read to limit the scope of the invention.

In one embodiment of the present invention, as shown in FIG. 1, the system 10 may include multiple elements including: a sub-domain finder utility 14, a webpage link analyzer utility 16, a sub-domain scorer engine 18, and a content-ranking engine 20. In this embodiment, a search term may be entered by a user, or otherwise provided to the system. The search term may be indicated to be relevant to one or more web pages 12. The indication that the web pages are relevant to the search term may be provided by a user to the system, or may be otherwise recognized by the system. The web pages may be utilized by the system to derive search results 22 which may be the output of the system.

In another embodiment of the present invention, a sub-domain computer application, or computer program product may be provided, whereby a domain may be searched and analyzed to provide search results that reflect a ranking or weighing of a sub-domain of interest that reflects one or more related sub-domains. The computer program product may be non-transitory and may further incorporate one or more processing elements, such as, for example a sub-domain finder, a webpage link analyzer, a sub-domain scorer, a content ranking and a search result communicator. The processing elements of the computer application may collectively generate and provide search results that rely upon processing of a sub-domain of interest identified in a domain, as well as an analysis of related sub-domains. The computer program product of this embodiment of the present invention may generally reflect the aspects of the present invention described in this patent application.

In another embodiment of the present invention a user may input one or more web pages into the system. These web pages may be utilized by the system as the basis for a search. For example, the system may be operable to derive the content of the web pages and from this content to determine the domain and any sub-domains relating to the web pages. The web pages may be utilized by the system to derive search results which may be the output of the system.

The elements of the present invention, as shown in FIG. 1, may be applied by the invention to achieve a specific flow of function by the system. For example, the sub-domains finder may be applied initially, the webpage link analyzer may be applied subsequently, the sub-domain scorer may be the next element to be applied by the system, and the content-ranking element may be applied as the last element prior to the output, or other application, of search results. A skilled reader will recognize that in embodiments of the present invention the elements may be applied in a different order. A skilled reader will further recognize that the exact application of the elements may be altered in accordance with the initial input into the system, for example, such as whether the initial input is a search parameter, a webpage, etc. The environment of the system, whether this is the Internet, or another media environment, may also affect the application of the elements shown in FIG. 1.

The description below describes the elements individually as they are applied in the flow of an embodiment of the present invention shown in FIG. 1.

The sub-domains finder may be operable to find one or more sub-domains in the Internet and/or Intranet. For example, the sub-domains finder may find one or more sub-domains in an Intranet server domain. The sub-domains that are found by the sub-domains finder may be related to the search term, web pages or other search parameters that are input into the system. The sub-domains that are found by the sub-domains finder may also include both the sub-domain of interest and one or more related sub-domains. The sub-domains may therefore include all sub-domains within a relevant Internet or Intranet server domain related to the search input (e.g., web pages, search term, or other search parameters that are input into the system).

The webpage link analyzer utility may determines all the links in each webpage of interest in the sub-domain of interest that link to other web pages in the related sub-domains to establish a collection of web content. The webpage link analyzer may be operable subsequent to the sub-domains finder. The collection of links may include the content of the webpage of interest and the content of linked web pages in other sub-domains. The webpage link analyzer utility may subsequently determine the relations among the sub-domains in the domain, in essence by establishing the particular sub-domains in which the linked pages are situated. The links may be recognized as identified sub-domain content.

The sub-domain scorer may calculate a sub-domain of interest score for each webpage, document, or any other identified sub-domain content, within the sub-domain(s) of interest. The sub-domain scorer may be applied subsequent to the webpage link analyzer. The sub-domain of interest score calculated by the sub-domain scorer may be based on the score that relates to occurrence of the webpage, document or other identified sub-domain content related to the search term within the sub-domain(s) of interest. The sub-domain of interest score may also be combined with a related sub-domain score that is generated for identified sub-domain content based on the search term occurring in any related sub-domain (s). The related sub-domains may be identified as sub-domains including web pages, documents or other identified sub-domain content that links to the particular webpage in the sub-domain of interest. The links to the webpage of the sub-domain of interest existing in the related sub-domains may be utilized to calculate the related sub-domain score. In one embodiment of the present invention, a known content search method may be applied by the sub-domain scorer. In another embodiment of the present invention, scores may be accessed in an Intranet server domain. A skilled reader will further recognize that although aspects of the sub-domain scorer operability are described in relation to a webpage and webpage links, other identified sub-domain content may be utilized by the present invention to calculate a score.

The content-ranking element, which may be a content-ranking engine, may be operable to rank and weight the search results of web pages. The content-ranking element may be applied subsequent to the sub-domain scorer. The search results may represent identified sub-domain content that is relevant to the input to the system for the search, for example, such as one or more web pages, a search term, search parameters, etc. A rank or weight may be allotted to each of the identified sub-domain content that is relevant to the input.

The output of the system may be a display of the search results, which may show the identified sub-domain content in order of rank or weight. For example the search results may be shown as a list, having the content ranked or weighed the highest appearing at the top of the list, and the content ranked or weighed the lowest appearing at the bottom of the list. Alternatively, only the most highly ranked search results may be displayed, or otherwise provided to the system. For example, a set number of highest weighed search results may be displayed and/or provided, such as the top 50, or any other number. A skilled reader will recognize that other displays indicating ranking or weighing of the content may be applied, such as colour-coding, differentiated fonts, indicator symbols, etc. The display may be provided to a user in an electronic form, or may be available in other forms. The ranked or weighed search results may also not be displayed at all, but be provided to the system for subsequent application. Alternatively, the search results may be displayed to a user and be provided to the system for subsequent application. The search results may also be stored by the system, for example, such as in a database or other storage means.

In one embodiment the present invention, the following method may be applied to achieve search results: (i) a user may enter search parameters to be applied to at least one sub-domain within a domain (for example, the search parameters may include search terms, or optionally may include search terms and/or a selection of one or more particular sub-domains of interest, said search terms and/or selected sub-domains of interest may define the scope of the search); (ii) a determination of all related sub-domains from within the domain that comprises the sub-domain(s) of interest ("related sub-domains") may occur; (iii) an analysis of all links in each webpage within the sub-domains(s) of interest that link to web pages in any of the related sub-domains may occur; and (iv) a search based on the search terms may be conducted within each of the related sub-domains.

A skilled reader may recognize that the scope of the search facilitated by the present invention (i.e. the universe of web pages of interest) may include all web pages that are part of the sub-domains of interest.

The present invention may incorporate, or otherwise be applied in combination with, other prior art techniques. For example, it may be possible that an initial narrowing of the list of specific web pages of interests to be considered to exist within the sub-domain of interest may occur. This narrowing may have the effect of further narrowing the search results. The system and method of the present invention may be utilized based upon the narrowed list of specific web pages of interest to improve the relevance and accuracy of the search results that would otherwise be achieved by the prior art in isolation, as is discussed in more detail above.

In one embodiment of the present invention, the method applied may further include: ranking each webpage of interest based on a weighing of content scores as explained below under "Weighing and Ranking". This weighing may be established by references to the related sub-domains.

Weighing and Ranking

In one embodiment of the present invention, for each webpage of interest, the content-ranking engine may establish a weighed content score by calculating a content score. The calculation of the content score may be based on several inputs, including the following: (1) the content score of the webpage of interest, and (2) the content score of the related sub-domains. The content score of the related sub-domains may be determined by the webpage link analyzer utility and may be identified sub-domain content, for example, such as links from the webpage of interest. The content-ranking engine may weigh the results of the calculation inputs (1) and (2). Either optionally or additionally, calculation input (2) being the score for the related sub-domains, may be established solely by reference to the web pages within the related sub-domains that link from the webpage of interest.

A skilled reader will recognize that calculation input (1) provides an initial ranking of the webpage of interest. A re-ranking therefore occurs when calculation input (1) is joined by calculation input (2). The weighing of calculation inputs (1) and (2) may be established in a number of ways, for example based on statistics and content. A higher content score, for example, is typically assigned to web pages of interest that link to other web pages comprising the search term. The weight of each webpage in a related sub-domain may be based on the frequency of the search term in that webpage. The weight may also be determined for a collection of web pages based on: (i) the frequency of the search term in each webpage that comprises the collection; and (ii) a document frequency that is calculated by determining the number of web pages that contain a term divided by the total number of web pages in the collection. A skilled reader will recognize that a variety of means of calculating a score may be applied by the present invention.

The content-ranking engine may define the content score of a webpage recursively and based on the weights of all web pages in other sub-domains that link from that webpage. For example, a particular webpage in a sub-domain of interest may have links to other web pages in other sub-domains. The other web pages may have a higher content score relating to a search term based on the relevance and/or occurrence of the search term in the text content of the web pages. The content score for the particular webpage may increase in accordance with the content scores awarded due to the relevance and/or occurrence of the search term in the text content of the webpage.

Additionally, the content-ranking engine may be configured to calculate a content score for webpage collections of any size. For example, the weights of all the web pages in a collection may be divided by the weight of the webpage search result.

In embodiments of the present invention, the content score of each webpage may be calculated using one or more iterations. Additional iterations may facilitate a more accurate content score for each webpage. The web pages may then be ranked from highest score to lowest score, or some other criteria.

At the end of the process, a search result listing one or more web pages in the sub-domain of interest, based on rank, may be displayed to the user. Alternatively, the search results can be one of the web pages, typically having the highest rank, being automatically displayed. As yet another alternative, the search results may be provided to the system for a subsequent purpose.

Figure 2:
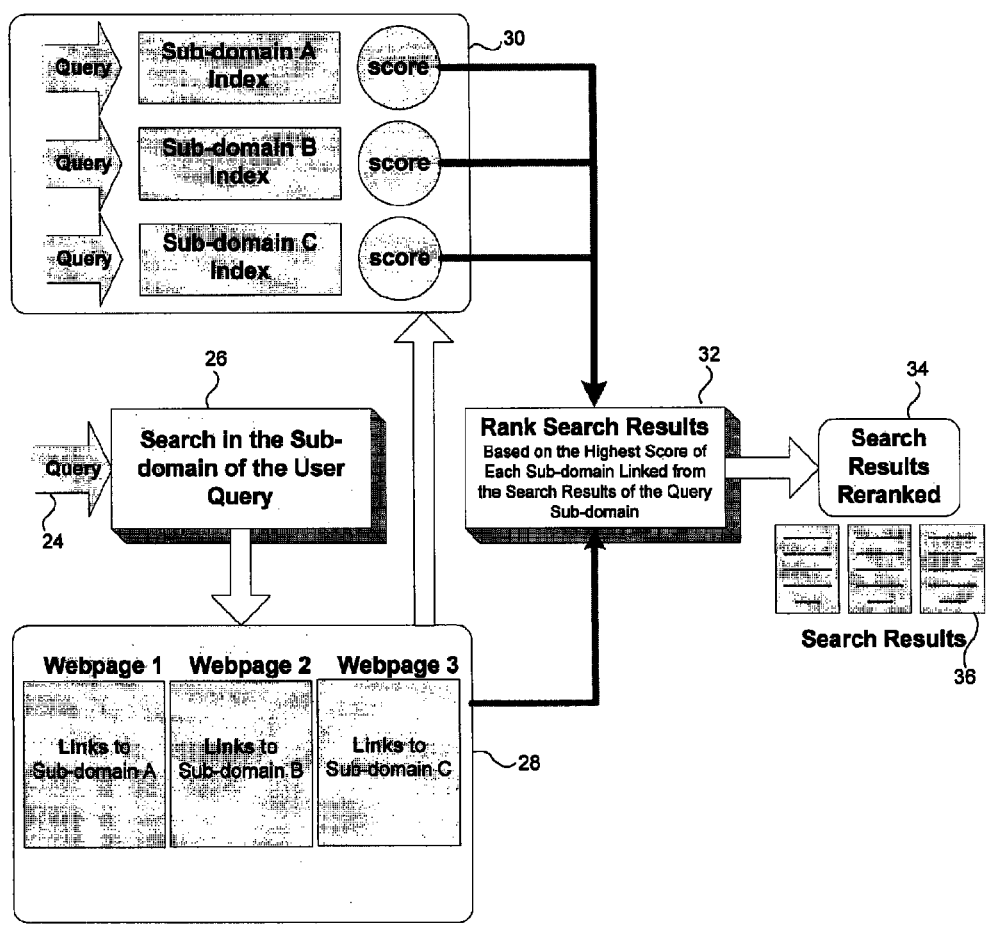
FIG. 2 illustrates a search system in accordance with an embodiment of the present invention.

An example of the weighing applied by an embodiment of the present invention is shown in FIG. 2. In this example, a user may submit a search term 24 relating to a sub-domain of interest 28. One or more web pages may exist within the sub-domain of interest 28, and such web pages may contain links to one or more web pages in related sub-domains 30.

The search term may be submitted to the related sub-domains to provide a content score for the related sub-domains. For each webpage of interest, a weighing may be provided based on the content scores of the related sub-domains that are linked from the webpage of interest. A ranking may be provided based on the weighing 32. The search results may be re-ranked 34, as described above, and the search results 36 may be presented to a user.

A skilled reader will recognize that the present invention may be integrated with a ranking method used by a known search method. A skilled reader will further recognize that the present invention may be applied for re-ranking of the results of a known search method.

A skilled reader will also recognize that the present invention may also be applied, as an independent search method application, to the sub-domain(s) of interest. For example, in one embodiment of the present invention, the document a user is searching for may not contain the terms of the search query. Yet the content of the document may relevant to the search query nonetheless. This document may be linked to other documents in related sub-domains that do contain the terms of the search query. In such an instance as this the present invention may be operable to locate the required document to be found as a stand-alone search system. Therefore, there the present invention will not requiring the integration of a known search method with the present invention in order to search the documents of the sub-domain(s) of interest.

Implementation

In one embodiment of the present invention, a system may be implemented over a distributed network, for example a local area network or a wide area network such as the Internet or an Intranet.

In another embodiment of the present invention, one or more servers may be incorporated in the present invention, and these one or more servers may facilitate and/or operate a main processor, such as a search processing facility, and/or elements of the present invention. For example, the one or more servers may facilitate and/or operate elements of the present invention including a sub-domains finder utility, sub-domains finder, a webpage link analyzer, a sub-domain scorer, and/or a content-ranking engine.

In yet another embodiment of the present invention, a web server may be integrated with the system. The web server may be operable to facilitate access to the system and in particular to a search processing facility of the system, by a client computer over a network. The web server may also be operable to facilitate access to one or more web pages in the domains and/or sub-domains (including the sub-domain of interest and any other relevant sub-domains) that are to be utilized in the present invention.

In still another embodiment of the present invention, a user interface may be utilized and presented to a user. The user interface may be accessible by a user through a client computer that is integrated with, or otherwise linked to, the present invention. The client computer may include a user interface that may be of a variety of types of user interfaces, for example, such as a web browser. The user interface may be operable to display, and interface with, a search term input, query input, webpage input or other search parameter input. These forms of input may be provided by a user, or may be provided by other means. The input may further be, or include, sub-domain of interest input. As an example, the present invention user interface may permit a user to input to the user interface a search term and sub-domain of interest. A skilled reader will recognize that other input options may be provided by the present invention.

The user interface may be operable to provide access to the search processing facility. This access may be facilitated by input to a search field on a search portal webpage, a search field integrated to a webpage accessible by a domain or sub-domain of the network, or a web application. The user interface may also enable a user to initiate a search, for example, such as by clicking on one or more terms in a webpage or other content display. The activity of clicking on this content may activate a search command. The search command may be provided as an integrated command in a web browser or web application. The system may utilize the search command to initiate a search process. For example, in one embodiment the search command may be transferred to a search processing facility element of the present invention. This search processing facility may utilize the search command to operate one or more of the following elements of the present invention: sub-domains finder, a webpage link analyzer, a sub-domain scorer, and/or a content-ranking engine.

The client computer may be configured to operate a web browser or a web application. The search term may be transferred from the client computer through the web browser or web application. The sub-domain of interest may be specified to a web server either by this transfer for the search term, or through other means. The web server may be operable to process the web pages in the domain and/or sub-domain(s) in accordance with the method of the present invention.

In one embodiment of the present invention, the output of the present invention may be a search result webpage. This search result webpage may be generated by the web server. The search result webpage may list one or more web pages, or other identified sub-domain content, that has the highest content scores. Content scores are generated for identified sub-domain content, which may included one or more web pages, in the manner described above, in particular in the "Weighing and Ranking" section of this specification. The search result webpage may be delivered to the web browser or web application on the client computer for display to the user.

System

Figure 8:
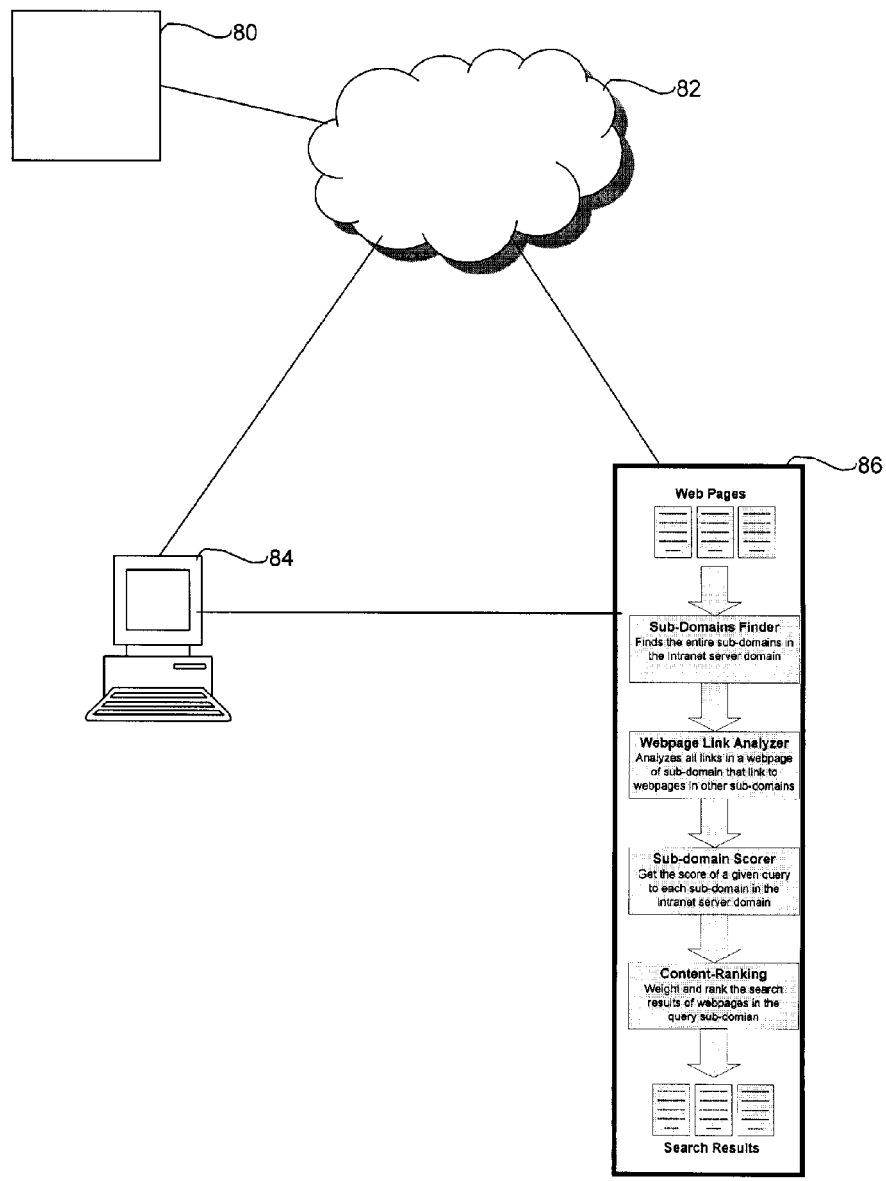
FIG. 8 is system diagram of an embodiment of the present invention.

A skilled reader will recognize that embodiments of the present invention may include various system configurations. An example of one such system configuration of an embodiment of the present invention is shown in FIG. 8. In this embodiment of the present invention a web server 80 may be connected to, or otherwise in communication with the Internet 82. In alternative system configurations of embodiments of the present invention the web server may connect to or otherwise be in communication any electronic information environment, such as, for example an Intranet, a cloud computing environment, or other servers or applications that process information or documentation, such as, for example database applications and/or libraries.

As shown in FIG. 8, a user may utilize a computing device 84, such as, for example a desktop computer, laptop computer, a cell phone, a personal digital assistant, a smart phone, a BlackBerry™, or other computing device, to connect to the Internet. The computing device may be utilized to provide a search command, which may include one or more search terms or other searching parameters, to the Internet 82. The Internet may either incorporate, or be connected to, a search engine application that may identify web-pages based upon the search term. The search engine application may utilize the web server to access web-pages. These web-pages may represent any of the domains, sub-domains of interest, or related sub-domains. The web-pages may be provided to a sub-domain application 86 that may generate search results in the form of a list or other representation of the sub-domain of interest to reflect the ranking and weighing described in this application as an embodiment of the present invention. For example, as shown in FIG. 8, the sub-domain application 86 may include particular processing elements such as, a sub-domains finder, a webpage link analyzer, a sub-domain scorer, and a content ranking.

The sub-domain application may generate search results that may be transferred, or otherwise communicated to the computing device of the user. For example, the search results may be displayed to the user on a display connected to, or integrated with, the computing device.

A skilled reader will recognize that other embodiments of the present invention are possible. Other embodiments of the present invention may not be as reliant upon web pages, as are several of the embodiments of the present invention disclosed in this patent application. The description of the present invention as it relates to the use of web pages is provided merely as an example of possible embodiments of the present invention. It is possible to apply the present invention utilizing input, identified sub-domain content, and output that is not related to web pages, or is related to web pages and other input, identified sub-domain content and output.

Example

Figure 3:
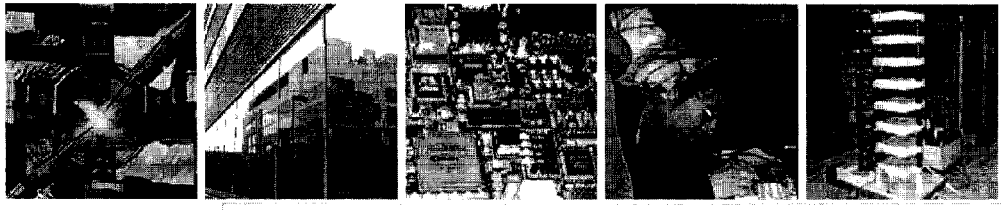
FIG. 3 illustrates an example of a prior art search.
Figure 4:
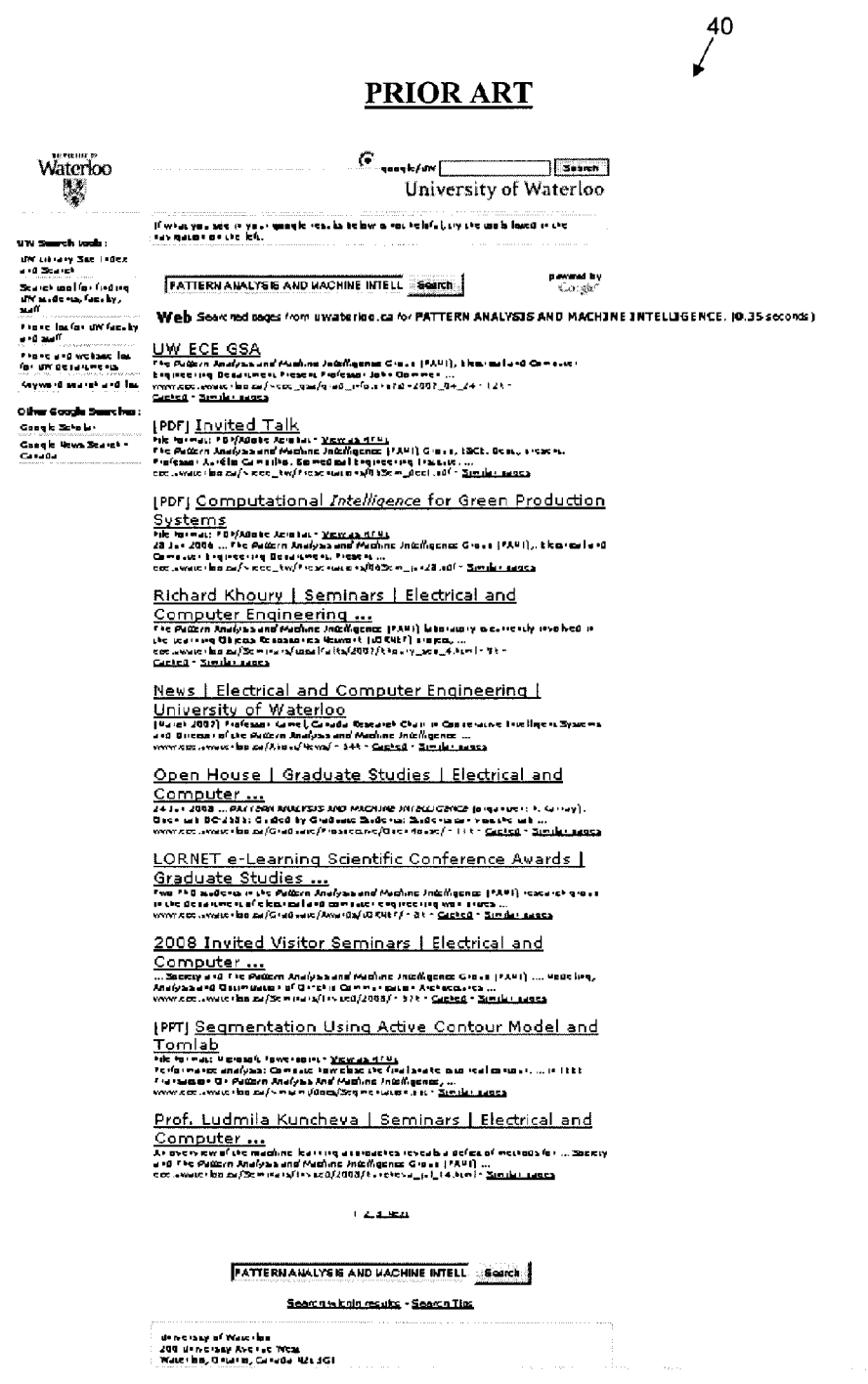

FIGS. 3 to 7 illustrates an example of the present invention showing a comparison between the present invention and known prior art. The example relies upon input search query that relates to a sub-domain of interest that is "The Department of Electrical and Computer Engineering" and the University of Waterloo ("ECE"). The content of the sub-domain of interest includes content relating to "Pattern Analysis and Machine Intelligence" ("PAMI") in a related sub-domain. As shown in FIG. 3, the ECE website 38 comprises general purpose information on electrical and computer engineering. There is another sub-domain PAMI, which comprises detailed information on "Pattern Analysis and Machine Intelligence".

FIG. 3 shows a typical prior art search wherein a user searches for ECE and then searches for "Pattern Analysis and Machine Intelligence" in the sub-domain of ECE. A typical search result generated based upon the search in FIG. 3, showing search results 40 within the sub-domain ECE may be the search result shown in FIG. 4. Each webpage in the search result mentions "Pattern Analysis and Machine Intelligence", however the search result does not take into account the links to PAMI that may be in web pages in ECE.

The difference in the search and/or search results that may occur when the present invention is utilized are shown in FIGS. 5-7. A user may search for "Pattern Analysis and Machine Intelligence" in the sub-domain ECE, by entering search input in an Internet or Intranet page 50, as shown in FIG. 5. This search may utilize the system of the present invention, as is described in this patent application. The search results that may be generated based upon the search input shown in FIG. 5, may include the search results 60, as shown in FIG. 6. A search conducted in accordance with the present invention, as shown in FIG. 6, may include as one of the highly ranked results (i.e., the third result as shown in FIG. 6) a search result that may lead a user to a webpage of interest in ECE that links to PAMI. The webpage of interest 70, as shown in FIG. 7, may contain a link to the "Pattern Analysis and Machine Intelligence Group" that links to PAMI.

Thus, FIGS. 3-7 show that whereas the prior art may not rank and/or weigh the link to PAMI highly, the present invention may calculate a high content score for the link to the PAMI reference. The difference in the search results between the prior art and the present invention are related to the use of sub-domain(s) content by the prior art system and present invention system. As described in this patent application, the present invention utilizes a broader range of sub-domains (including the sub-domain of interest and one or more other related sub-domains) when weighing and ranking identified sub-domain content of the sub-domain of interest. The present invention may provide more accurate search results than the prior art. The present invention may also bring specific search result(s) to the attention of a user by ranking the search result(s) higher than does the prior art. Bringing the specific search result(s) to the attention of the user can have particular benefits for the user (e.g., they may spend less time looking for relevant content, etc.).

It will be appreciated by those skilled in the art that other variations of the embodiments described herein may also be practiced without departing from the scope of the invention. Other modifications are therefore possible.

We claim:

1. A computer-implemented system for generating sub-domain ranked or weighed search results, characterized in that the system comprises:
    (a) a web server connected to an electronic information environment;
    (b) at least one computing device comprising one or more computer processors configured to provide one or more search commands to the electronic information environment to be used to provide search information; and
    (c) a sub-domain application connected to the at least one computing device and the electronic information environment, said sub-domain application being configured to receive search information from the electronic information environment and to identify one or more sub-domains of interest from the received search information, said sub-domain application further being configured to identify one or more related sub-domains and to generate one or more search results that reflect a ranking or weighing of the sub-domain of interest in relation to the one or more related sub-domains, wherein the one or more related sub-domains are identified based on the one or more search commands and web pages in the one or more sub-domains of interest, and wherein the one or more related sub-domains are accessible by links from web pages in the one or more sub-domains of interest;
    wherein the sub-domain application comprises:
        (1) a sub-domains finder configured to find the one or more sub-domains of interest in the search information;
        (2) a webpage link analyzer configured to analyze the search information to identify the one or more related sub-domains based on the one or more search commands;
        (3) a sub-domain scorer configured to calculate one or more sub-domain of interest scores based on the analysis of the one or more sub-domains of interest in the search information, and one or more related sub-domain scores based on the analysis of the one or more related sub-domains in the search information; and
        (4) a content-ranking engine configured to calculate a weighed content score of each of the one or more search results based on the one or more sub-domain of interest scores and the one or more related sub-domain scores, and rank the one or more search results based on the weighed content score of each search result;

wherein the content-ranking engine is further configured to calculate the weighed content score recursively, based on (i) a weight of each web page in the one or more related sub-domains linked from the respective search result and (ii) a collected weight of a collection of web pages in the one or more related sub-domains, the collected weight determined based on a document frequency calculated by dividing a total number of web pages in the collection of web pages by a number of web pages that contain a term in the one or more search commands.

2. The system of claim 1, characterized in that the electronic information environment is one of the following: an Internet; an Intranet; and a database.

3. The system of claim 1, characterized in that the electronic information environment is an Internet and the search information is one or more web pages.

4. The system of claim 1, characterized in that the sub-domain application incorporates one or more processing elements operated by one or more computer processors.

5. The system of claim 1, characterized in that the sub-domain application is configured to communicate the search results to the computing device.

6. The system of claim 5, characterized in that the computing device is linked to or incorporates a display means, said display means being configured to display the search results to a user.

7. The system of claim 1, characterized in that the one or more search commands include at least one of the following: one or more search parameters; one or more web pages; an information package; and one or more search terms.

8. The system of claim 1, characterized in that the computing device is one or more of the following: a desktop computer, laptop computer, a cell phone, a personal digital assistant, and a smart phone.

9. A computer-implemented method for generating sub-domain ranked or weighed search results, the method comprising the steps of:
   (a) receiving or accessing one or more search commands applicable to one or more sub-domains of interest within a domain to a computing device, said computing device being connected to an electronic information environment;
   (b) transferring the one or more search commands to the electronic information environment and identifying one or more related sub-domains relevant to the one or more sub-domains of interest, wherein the one or more related sub-domains are identified based on the one or more search commands and web pages in the one or more sub-domains of interest, and wherein the one or more related sub-domains are accessible by links from web pages in the one or more sub-domains of interest;
   (c) calculating one or more sub-domain of interest scores based on analysis of the one or more sub-domains of interest in the one or more search commands, and one or more related sub-domain scores based on analysis of the one or more related sub-domain;
   (d) generating one or more search results based on analysis of the one or more sub-domains of interest and the one or more related sub-domains; and
   (e) calculating a weighed content score of each of the one or more search results based on the one or more sub-domain of interest scores and the one or more related sub-domain scores, and ranking the one or more search results based on the weighed content score of each search result;

wherein the weighed content score is calculated recursively, based on (i) a weight of each web page in the one or more related sub-domains linked from the respective search result and (ii) a collected weight of a collection of web pages in the one or more related sub-domains, the collected weight determined based on a document frequency calculated by dividing a total number of web pages in the collection of web pages by a number of web pages that contain a term in the one or more search commands.

10. The method of claim 9, characterized in that it comprises the further step of communicating the one or more search results to the computing device.

11. The method of claim 9, characterized in that it comprises the further step of the computing device generating the one or more search commands based upon data provided to the computing device.

12. The method of claim 9, wherein the one or more search commands include at least one of the following: one or more search parameters; one or more web pages; an information package; and one or more search terms.

13. A computer-implemented web-based method for generating sub-domain ranked or weighed search results, characterized in that the method comprises the steps of:
   (a) obtaining one or more search commands from a computer device utilizing the one or more search commands to define a domain and at least one sub-domain of interest within an Internet environment, said domain and at least one sub-domain of interest including one or more web pages;
   (b) analyzing the domain and at least one sub-domain of interest to identify one or more related sub-domains that are accessible by links from the web pages in the at least one sub-domain of interest, wherein the one or more related sub-domains are identified based on the one or more search commands and the web pages in the at least one sub-domain of interest;
   (c) searching within each of the one or more related sub-domains to define a related sub-domain content score for each of the one or more related sub-domains;
   (d) calculating one or more sub-domain of interest scores based on analysis of the at least one sub-domain of interest in the one or more search commands, and one or more related sub-domain scores based on analysis of the one or more related sub-domain;
   (e) generating one or more search results based on analysis of the at least one sub-domain of interest and the one or more related sub-domains; and
   (f) calculating a weighed content score of each of the one or more search results based on the one or more sub-domain of interest scores and the one or more related sub-domain scores, and ranking the one or more search results based on the weighed content score of each search result;

wherein the weighed content score is calculated recursively, based on (i) a weight of each web page in the one or more related sub-domains linked from the respective search result and (ii) a collected weight of a collection of web pages in the one or more related sub-domains, the collected weight determined based on a document frequency calculated by dividing a total number of web pages in the collection of web pages by a number of web pages that contain a term in the one or more search commands.

14. The method of claim 13, characterized in that it comprises the further step of communicating the search results to a computing device.

15. The method of claim 14, characterized in that it comprises the further steps of displaying the search results to a user on a display means linked or integrated with the computing device.

16. The method of claim 13, characterized in that it comprises the further step of re-ranking the search results.

17. The method of claim 13, wherein the one or more search commands include at least one of the following: one or more search parameters; one or more web pages; an information package; and one or more search terms.

18. A non-transitory computer readable storage medium having program instructions for a sub-domain computer application stored thereon, wherein the program instructions, when executed by at least one computer processor, generates ranked or weighed search results, characterized in that the program instructions, when executed by the at least one computer processor, configure one or more computers to:
  (a) receive or access one or more search commands applicable to one or more sub-domains of interest within a domain to a computing device, said computing device being connected to an electronic information environment;
  (b) transfer the one or more search commands to the electronic information environment and identify one or more related sub-domains relevant to the one or more sub-domains of interest, wherein the one or more related sub-domains are identified based on the one or more search commands and web pages in the one or more sub-domains of interest, and wherein the one or more related sub-domains are accessible by links from web pages in the one or more sub-domains of interest;
  (c) calculate one or more sub-domain of interest scores based on analysis of the one or more sub-domains of interest in the one or more search commands, and one or more related sub-domain scores based on analysis of the one or more related sub-domain;
  (d) generate one or more search results based on analysis of the one or more sub-domains of interest and the one or more related sub-domains; and
  (e) calculate a weighed content score of each of the one or more search results based on the one or more sub-domain of interest scores and the one or more related sub-domain scores, and ranking the one or more search results based on the weighed content score of each search result;
  wherein the weighed content score is calculated recursively, based on (i) a weight of each web page in the one or more related sub-domains linked from the respective search result and (ii) a collected weight of a collection of web pages in the one or more related sub-domains, the collected weight determined based on a document frequency calculated by dividing a total number of web pages in the collection of web pages by a number of web pages that contain a term in the one or more search commands.

19. The non-transitory computer readable storage medium of claim 18, further configuring the one or more computers to display the one or more search results on the computing device.

20. The non-transitory computer readable storage medium of claim 18, further configuring the one or more computers to generate the one or more search commands based upon data provided to the computing device.

21. The non-transitory computer readable storage medium of claim 18, wherein the one or more search commands include at least one of the following: one or more search parameters; one or more web pages; an information package; and one or more search terms.

* * * * *

UNITED STATES PATENT AND TRADEMARK OFFICE
CERTIFICATE OF CORRECTION

| | |
|---|---|
| PATENT NO. | : 9,075,879 B2 |
| APPLICATION NO. | : 13/497564 |
| DATED | : July 7, 2015 |
| INVENTOR(S) | : Shady Shehata, Fakhri Karray and Mohamed Salem Kamel |

Page 1 of 1

It is certified that error appears in the above-identified patent and that said Letters Patent is hereby corrected as shown below:

On the Title page, item (76) the Inventors should appear as follows:

Shady Shehata, Waterloo (CA); Fakhri Karray, Waterloo (CA); Mohamed Salem Kamel, Waterloo (CA).

Signed and Sealed this
Eighth Day of December, 2015

Michelle K. Lee
*Director of the United States Patent and Trademark Office*